(12) United States Patent
Urban et al.

(10) Patent No.: US 12,133,212 B2
(45) Date of Patent: Oct. 29, 2024

(54) NETWORK SCHEDULING FOR IMPROVED RELIABILITY

(71) Applicant: Comcast Cable Communications, LLC, Philadelphia, PA (US)

(72) Inventors: David Urban, Downingtown, PA (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/054,922

(22) Filed: Feb. 26, 2016

(65) Prior Publication Data

US 2017/0251488 A1 Aug. 31, 2017

(51) Int. Cl.
*H04W 72/12* (2023.01)
*H04W 56/00* (2009.01)
*H04W 72/1263* (2023.01)
*H04W 74/02* (2009.01)

(52) U.S. Cl.
CPC ..... *H04W 72/1263* (2013.01); *H04W 56/001* (2013.01)

(58) Field of Classification Search
CPC ......... H04W 72/1263; H04W 72/1278; H04W 74/0808; H04W 74/0825
See application file for complete search history.

(56) References Cited

U.S. PATENT DOCUMENTS

| | | | | |
|---|---|---|---|---|
| 6,181,708 B1* | 1/2001 | Quackenbush | ... | H04L 12/40013 370/445 |
| 6,434,112 B1* | 8/2002 | Kwon | ... | H04L 12/413 370/216 |
| 6,651,107 B1* | 11/2003 | Conley | ... | G06F 13/385 709/250 |
| 8,942,201 B1* | 1/2015 | Duvvuri | ... | H04W 28/044 370/314 |
| 2002/0136233 A1* | 9/2002 | Chen | ... | H04W 72/1215 370/445 |
| 2003/0083095 A1* | 5/2003 | Liang | ... | H04W 72/1215 455/552.1 |
| 2006/0067312 A1* | 3/2006 | Ross | ... | H04W 72/1215 370/388 |
| 2006/0100000 A1* | 5/2006 | Marples | ... | H04B 1/1615 455/574 |
| 2006/0292987 A1* | 12/2006 | Ophir | ... | H04W 72/1215 455/41.2 |
| 2007/0036170 A1* | 2/2007 | Gonikberg | ... | H04W 16/14 370/431 |
| 2008/0103608 A1* | 5/2008 | Gough | ... | G05B 15/02 700/1 |
| 2009/0040974 A1* | 2/2009 | Goldhamer | ... | H04W 74/02 370/329 |

(Continued)

*Primary Examiner* — Scott M Sciacca
(74) *Attorney, Agent, or Firm* — Ballard Spahr LLP

(57) ABSTRACT

Methods and systems for managing communications among network devices are disclosed. An example method can comprise determining a time window for transmission based on a scheduling protocol. The scheduling protocol can specify time windows for using corresponding wireless protocols to transmit signals. Different wireless protocols can be associated with different time windows and different devices. A device can prevent transmissions during the time window, thereby allowing other devices to provide transmissions during the time window according to the scheduling protocol.

34 Claims, 6 Drawing Sheets

(56) References Cited

U.S. PATENT DOCUMENTS

| | | | |
|---|---|---|---|
| 2010/0008338 A1* | 1/2010 | Tsfati | H04B 1/006 |
| | | | 370/338 |
| 2010/0009725 A1* | 1/2010 | Banerjea | H04W 52/0216 |
| | | | 455/574 |
| 2010/0284380 A1* | 11/2010 | Banerjee | H04W 16/14 |
| | | | 370/338 |
| 2012/0257558 A1* | 10/2012 | Shin | H04W 52/0229 |
| | | | 370/311 |
| 2013/0089027 A1* | 4/2013 | Son | H04W 80/02 |
| | | | 370/328 |
| 2014/0233536 A1* | 8/2014 | Kang | H04L 5/1438 |
| | | | 370/336 |
| 2014/0329498 A1* | 11/2014 | Cherian | H04W 12/06 |
| | | | 455/411 |
| 2015/0082064 A1* | 3/2015 | Sinha | H04W 52/0251 |
| | | | 713/323 |
| 2016/0112886 A1* | 4/2016 | Malik | H04W 4/80 |
| | | | 370/225 |
| 2016/0295434 A1* | 10/2016 | Safavi Naeini | H04W 40/04 |
| 2017/0013556 A1* | 1/2017 | Tanaka | H04W 16/14 |
| 2017/0207877 A1* | 7/2017 | Zhang | H04W 74/0816 |
| 2017/0230908 A1* | 8/2017 | Agarwal | H04W 52/0209 |

\* cited by examiner

NETWORK SCHEDULING FOR IMPROVED RELIABILITY

BACKGROUND

The development and deployment of new wireless devices is causing networks to become more crowded. Different wireless devices may use different wireless protocols and data transmission schedules, which may add different constraints to network deployment and maintenance. The deployment of such devices in a network can cause interference and other communication problems. Thus, there is a need for more sophisticated methods and systems for managing transmissions of network devices.

SUMMARY

It is to be understood that both the following general description and the following detailed description are exemplary and explanatory only and are not restrictive. Methods and systems for managing network devices are disclosed. In some aspects, The disclosed methods and systems can be utilized to improve latency and reliability in networks, such as wireless networks. An example network can comprise a variety of devices configured to communicate using a variety of communication protocols, such as wireless protocols (e.g. WiFi, Bluetooth®, ZigBee®, Z-Wave®). In some cases, transmissions over the network can cause interference. The methods and systems can comprise a scheduling protocol that specifies timing information, such as time windows, start times, periodicity, and/or the like for sending and/or receiving transmissions. The scheduling protocol can specify different timing information for a variety of communication protocols, and timing information for a variety of devices using the same or different protocols. The timing information can comprise, alone or as part of a scheduling protocol, information related to determining appropriate start times, periodicity, and/or the like, and information related to timing for sending information and transmissions over a network.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
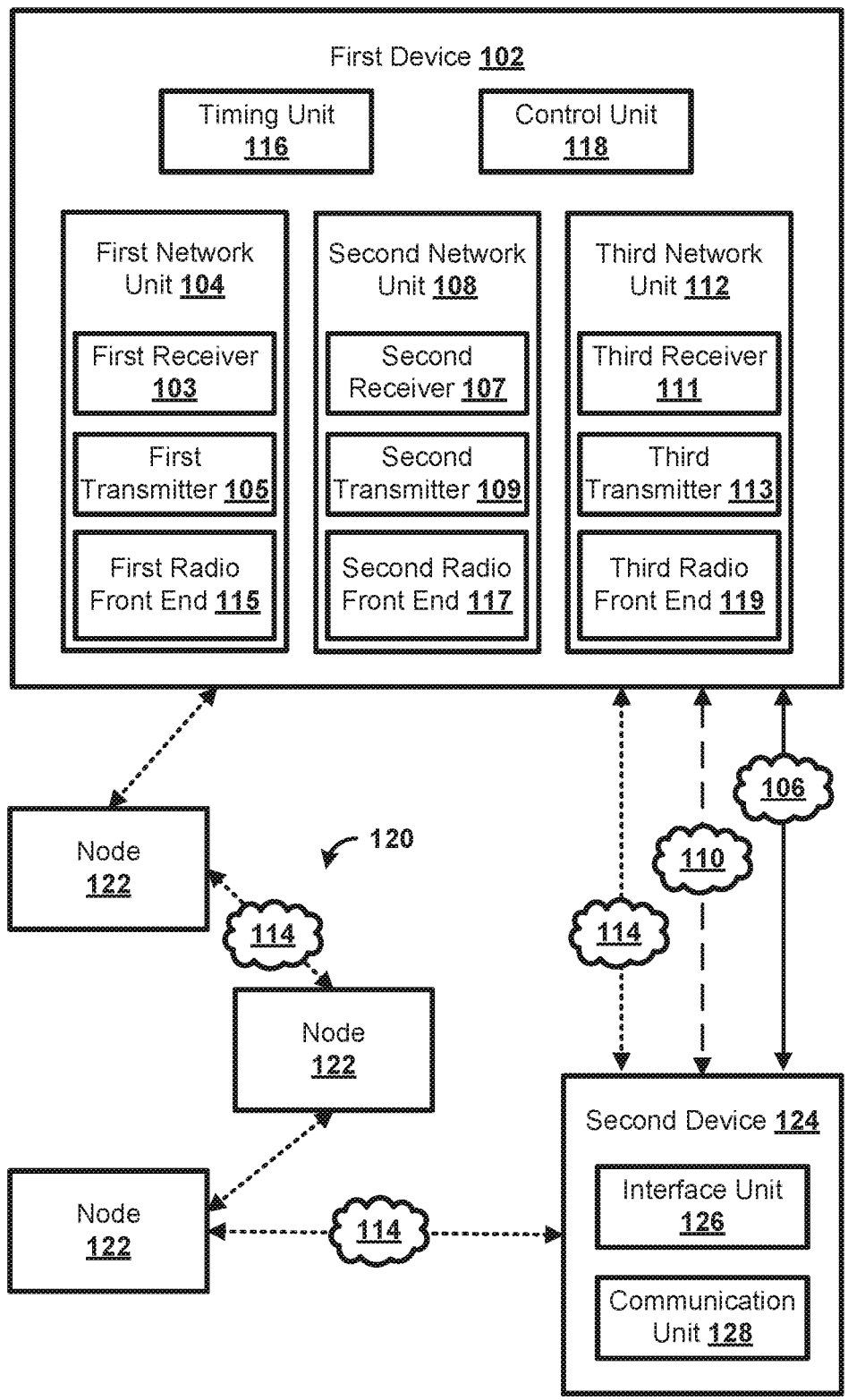
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to management of network devices. The present methods and systems allow for intelligent scheduling of network transmissions specific to communication protocols used for transmission, a device type of a device sending the transmission, and/or the like. For example, the present methods and systems can comprise a scheduling protocol configured to specify timing information, such as time windows (e.g., time period for transmitting data, time period for delaying transmission of data), start times, periodicity, and/or the like. The scheduling protocol can comprise rules, logical elements, conditions, formulas, and/or the like for determining and/or calculating the timing information. The timing information can be specific to corresponding communications protocols. For example, the scheduling protocol can specify timing information for a first wireless protocol (e.g., WiFi, 802.11 based protocol). The scheduling protocol can specify different timing information for a second wireless protocol (e.g., Bluetooth®, ZigBee®, Z-Wave®). Example rules of the scheduling protocol can comprise rules for static scheduling and rules for dynamic scheduling. Rules for static scheduling can specify a static schedule. For example, a recurring time period can be divided into specific transmission times for specific devices, categories of devices, specific communication protocols, categories of protocols, and/or the like. The rules for dynamic scheduling can comprise rules for dynamically generating transmission schedules (e.g., temporary transmission schedules) based on current network conditions, such as devices currently within a network. Accordingly, devices on a network can coordinate transmissions across multiple devices based on the scheduling protocol to improve latency and reliability.

In an aspect, a first network device can provide a first transmission. If the first network device detects interference (e.g., a collision) from a second transmission, then the first network device can determine a time window based on the scheduling protocol. The first network device can prevent, withhold, and/or the like, transmissions during the time window. In another aspect, a time window can be determined based on the scheduling protocol. A network device can prevent transmission during the time window and enable transmissions after the time window. In another aspect, a transmission can be received at a network device, such as a client device and the network device can determine timing information associated with the received transmission. A time window can be determined using the scheduling protocol and the timing information. For example, the network device can synchronize the network device's clock, determine a time offset, and/or the like.

In an aspect, the present methods and systems can modify current packet scheduling (e.g., and corresponding dead air time) to take advantage of and more intelligently use carrier sense multiple access protocol with collision avoidance (CSMA-CA) and/or other protocols, which configure devices for un-coordinated scheduling. The scheduling protocol can configure independent networks to detect transmissions more quickly, allowing more important transmissions through with a lower latency (e.g., at the cost of a minor total throughput drop) than achieved with conventional uncoordinated scheduling.

FIG. 1 illustrates various aspects of an example system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an aspect, the system 100 can comprise a first device 102. The first device 102 can comprise an access point, such as a wireless access point. The first device 102 can comprise a computing device, such as a gateway, a router, a switch, a server, and/or the like. The first device 102 can be located in a user's home, a premises, a business premises, a transit location (e.g., train or bus stop), a recreation area (e.g., park), and/or the like. For example, the first device 102 can be located in a dense area (e.g., multiple access points are used to cover the same area) or a remote area (e.g., a single access point covers an area remote from other access points, such as a park bench, transit waypoint). The first device 102 can be powered by a power line and/or by internal or external battery power. The first device 102 can be powered by an alternative energy source, such as wind power, solar power, and/or the like.

The first device 102 can be configured to communicate with one or more second devices 124. The second devices 124 can comprise a client device, such as a user device. The second devices 124 can comprise network devices (e.g., gateways, routers, switches, media servers), user devices (e.g., computers, mobile devices, tablets, televisions), sensors (e.g., environmental, network, or security sensors), remote controlled devices (e.g., automation devices), and/or the like. For example, as explained further herein, the first device 102 can be in a local area network with a plurality of sensors, user devices, remote controlled devices, network devices, and/or the like. For example, a user can deploy sensors (e.g., a camera, a door sensor, a window sensor, a temperature sensor, an infrared sensor) for a home or a business security network. The user can also deploy user devices (e.g., smart phones) and/or the remote control devices, e.g., to automate and/or control remotely window accessories, thermostat settings, locks, light switches, appliances, and/or the like. The second devices 124 can be configured to provide content, services, information, applications, and/or the like to one or more users. For example, the second devices 124 can comprise a computer, a smart device (e.g., a smart phone, a smart watch, smart glasses, smart apparel, a smart accessory), a laptop, a tablet, a set top box, a display device (e.g., television, monitor), a digital streaming device, a proxy, a gateway, a transportation device (e.g., an onboard computer, a navigation system, a vehicle media center), sensor, and/or the like.

In an aspect, the first device 102 can comprise a first network unit 104 configured to communicate via a first network 106. For example, the first network 106 can comprise a WiFi network, such as an 802.11 (e.g., 802.11a, b, g, n, ac, ad, af, ah, ai, aj, aq, ax) based wireless network. The first network 106 can comprise a cellular network, such as a 3G, 4G Long Term Evolution (LTE), LTE Advanced, and/or the like based wireless network. In an aspect, the first network unit 104 can comprise hardware and/or software components for communicating via a first protocol over the first network 106. For example, the first network unit 104 can comprise a first receiver 103, a first transmitter 105, a combination thereof (e.g., a first transceiver) and/or the like. The first transmitter 105 and/or the first receiver 103 can be configured to be turned off, changed to a reduced functionality mode, and/or the like. As explained further herein, the reduced functionality mode can comprise an operational mode in which a first device 102 reduces (e.g., after receiving instructions to reduce) operations, power consumption, and/or the like. For example, the reduced functionality mode can be entered by powering down the first transmitter 105 and/or the first receiver 103, sending a decreased amount of transmissions via the first transmitter 105 and/or the first receiver 103, relying on a lower power network unit (e.g., a second network unit 108, a third network unit 112) for communication, and/or the like. The first transmitter 105 and the first receiver 103 can comprise elements in common, such as local oscillator circuitry. Thus, powering down both the first transmitter 105 and the first receiver 103 may increase power savings. The first network unit 104 can comprise a first radio frequency front end. The first radio front end 115 (e.g., radio front end configured for radio frequency transmissions) can be configured to tune to (e.g., or otherwise select) a specific frequency, a frequency range, and/or the like for receiving and/or transmitting signals. For example, the first radio front end 115 can comprise circuitry (e.g., analog circuitry) between antenna ports and a digital-to-analog converter. In an aspect, multiple first network units 104 can be located in the first device 102. Each of the first network units 104 can comprise one or more corresponding transceiver, radio front end, radio, and/or the like. The first network unit 104 can comprise a software defined radio, a field programmable gate array, an application specific integrated circuit, and/or the like configured to implement the first protocol over the first network 106. In an aspect, the first network unit 104 can comprise multiple antennas. The first network unit 104 can be configured to manage multiple communication streams (e.g., queue, buffer, channel) for simultaneous transmission and/or receiving of separate data to one or more corresponding antennas of the multiple antennas to boost speeds. To enter the reduced functionality mode (e.g., and lower power), the first network unit 104 can be configured to reduce the number of antennas that are active, and/or reduce the number of communication streams the first device 102 is transmitting on and/or receiving on via the first network unit 104. The first network unit 104 can be configured to power down or otherwise reduce functionality of other components, such as external power amplifiers, low noise amplifiers, and/or the like of the first network unit 104 for additional power savings.

In an aspect, the first device 102 can comprise a second network unit 108 configured to send and receive information via a second network 110. It should be noted that the first network 106, the second network 110, and the third network 114 are shown using different types of dashed lines to illustrate that different networks may use different communication protocols for transmitting and receiving data. As an illustration, the first network 106 can use a WiFi protocol (e.g., 802.11x), the second network 110 can use a Bluetooth® protocol, and the third network 114 can use another protocol, such as ZigBee®, Z-wave®), an infrared based protocol, and/or the like. For example, the first network 106, the second network 110, and/or the third network 114 can provide communication within corresponding physical areas that at least partially overlap.

For example, the second network 110 can comprise a Bluetooth® network (e.g., Bluetooth® version 1.0, 1.1, 1.2, 2.0, 2.1, 3.0, 4.0, 4.1), such as a Bluetooth® low energy network. In an aspect, the second network unit 108 can comprise hardware and/or software components for communicating via a second protocol over the second network 110. For example, the second network unit 108 can comprise a second receiver 107, a second transmitter 109, a combination thereof (e.g., a second transceiver) and/or the like. The second transmitter 109 and/or the second receiver 107 can be configured to be turned off, changed to a reduced functionality mode, and/or the like. For example, the reduced functionality mode can be entered by powering down the second transmitter 109 and/or the second receiver 107, sending a decreased amount of transmissions via the second transmitter 109 and/or the second receiver 107, relying on a lower power network unit (e.g., the third network unit 112) for communication and/or the like. The second transmitter 109 and the second receiver 107 can comprise elements in common, such as local oscillator circuitry. Thus, powering down both the second transmitter 109 and the second receiver 107 may increase power savings.

The second network unit 108 can comprise a second radio front end 117 (e.g., front end configured for radio frequency transmissions). The second radio front end 117 can be configured to tune to (e.g., or otherwise select) a specific frequency, a frequency range, and/or the like for receiving and/or transmitting signals. For example, the second radio front end 117 can comprise circuitry (e.g., analog circuitry) between antenna ports and a digital-to-analog converter. In an aspect, multiple second network units 108 can be located in the first device 102. Each of the second network units 108 can comprise one or more corresponding transceiver, radio front end, radio, and/or the like. The second network unit 108 can comprise a software defined radio, a field programmable gate array, an application specific integrated circuit, and/or the like configured to implement the second protocol over the second network 110. In an aspect, the second network unit 108 can be configured to adjust a frequency of a duty cycle (e.g., how often all or a portion of the second network unit 108 is powered off and on). The second network unit 108 can be configured to power down or otherwise reduce functionality of other components, such as external power amplifiers, low noise amplifiers, and/or the like of the first network unit 104 for additional power savings. For example, the second network unit 108 can be configured to adjust a transmit power level. In an aspect, the second network unit 108 can be optimized for power saving. For example, the second network unit 108 can be configured to transmit and receive packets quickly (e.g., in comparison to the first network unit 104) in order to maximize the time the circuit elements of the second network unit 108 can be powered down.

In an aspect, the first device 102 can comprise a third network unit 112 configured to send and receive information via a third network 114. For example, the third network 114 can comprise a ZigBee® based network (e.g., based on 802.15.4 or related standard), an infrared communication link, Z-Wave® based network, and/or the like. In an aspect, the third network unit 112 can comprise hardware and/or software components for communicating via a third protocol over the third network 114. For example, the third network unit 112 can comprise a third receiver 111, a third transmitter 113, a combination thereof (e.g., a third transceiver) and/or the like. The third transmitter 113 and/or the third receiver 111 can be configured to be turned off, changed to a reduced functionality mode, and/or the like. For example, the reduced functionality mode can be entered by powering down the third transmitter 113 and/or the third receiver 111, sending a decreased amount of transmissions via the third transmitter 113 and/or the third receiver 111, and/or the like. The third transmitter 113 and the third receiver 111 can comprise elements in common, such as local oscillator circuitry. Thus, powering down both the third transmitter 113 and the third receiver 111 may increase power savings.

The third network unit 112 can comprise a third radio front end 119 (e.g., front end configured for radio frequency transmissions). The third radio front end 119 can be configured to tune to (e.g., or otherwise select) a specific frequency, a frequency range, and/or the like for receiving and/or transmitting signals. For example, the third radio front end 119 can comprise circuitry (e.g., analog circuitry) between antenna ports and a digital-to-analog converter. In an aspect, multiple third network units 112 can be located in the first device 102. Each of the third network units 112 can comprise one or more corresponding transceiver, radio front end, radio, and/or the like. In some scenarios, the third network unit 112 can be configured without the third radio front end 119. For example, if the third network unit 112 is configured for infrared communication, the third network unit 112 can comprise a light emitting diode, a laser, and/or the like configured to emit infrared, visible light, x-rays, and/or the like. The third network unit 112 can comprise a software defined radio, a field programmable gate array, an application specific integrated circuit, and/or the like configured to implement the third protocol over the third network 114. The third network unit 112 can be configured to power down or otherwise reduce functionality of other components, such as external power amplifiers, low noise amplifiers, and/or the like of the third network unit 112 for additional power savings.

In an aspect, the first network 106 can consume more power than the second network 110, and/or third network 114. For example, the first network 106 can be a high power consuming network in comparison to the second network 110 and/or third network 114. For example, various wireless devices can consume different amounts of power, use different types of battery, and/or the like. ZigBee®, Z-Wave®, Bluetooth®, infrared and/or the like devices typically use a smaller battery than the batteries used by WiFi devices. As another example, ZigBee®, Z-Wave®, Bluetooth®, infrared and/or the like devices typically use less power than WiFi devices. As an illustration, many devices (e.g., the first device 102, the second device 124) can comprise three or more radios. For example, cell phones can comprise multiple radios, each radio for communicating via a different protocol, such as 4G long term evolution (LTE), WiFi, and Bluetooth® as well as legacy cellular technologies, such as global system for mobile communication (GSM). Each radio may have a different coverage, a different speed, and a different energy consumption profile. In many of the devices, the third radio can comprise Bluetooth®, Bluetooth® low energy, or ZigBee®. Thus, the third radio (e.g., third network unit 112) may be the most power efficient in many cases and the best suited for alerting the first device 102 to turn on more data intensive operations.

In an aspect, the first device 102 can comprise a timing unit 116. For example, the timing unit 116 can be configured to determine timing information. Timing information can comprise a time window, a start time, a stop time, a duration of time, a periodicity, and/or the like. The timing information can be related to one or more devices, protocols, and/or the like. For example, the timing information can specify a start time, a periodicity, an end time, a time slot, and/or the like for sending transmissions according to corresponding protocols, such as wireless protocols (e.g., wireless communication protocols). The wireless protocols can comprise a WiFi, ZigBee®, Bluetooth® (e.g., Bluetooth® low energy), Z-Wave®, and/or the like. As an illustration, the timing information can comprise a time window having a start time (e.g., 11 pm) and an end time (e.g., 6 am). The time window can recur (e.g., daily, weekly, monthly) or be specific to a certain day. As another illustration, the timing information can comprise a start time (e.g., 5 pm) and a duration (e.g., 10 ms, 100 ms, 1 s). The start time can be associated with a periodicity (e.g., the time window can start again every X number seconds). For example, the periodicity can comprise a rate of recurrence of the time window, a time in between recurrence of the time window, and/or the like.

In an aspect, the timing unit 116 can be configured to determine the timing information based on a scheduling protocol. The scheduling protocol can be configured to specify (e.g., associate, define) timing information (e.g., a start time, an end time, a periodicity, time windows) for corresponding wireless protocols, device types, devices, and/or the like. The scheduling protocol can comprise rules, logical elements, conditions, formulas and/or the like for determining and/or calculating timing information. Example rules of the scheduling protocol can comprise rules for static scheduling and rules for dynamic scheduling. Rules for static scheduling can specify a static schedule. For example, a recurring time period can be divided into specific transmission times for specific devices, categories of devices, specific communication protocols, categories of protocols, and/or the like. The rules for dynamic scheduling can comprise rules for dynamically generating transmission schedules (e.g., temporary transmission schedules) based on current network conditions, such as devices currently within a network. For example, a central device or each device using the scheduling protocol can generate updated transmission schedules in response to changes in historical transmission trends, user settings (e.g., priority of device), a number and/or type of device introduced to an environment, and/or the like.

The scheduling protocol can be configured to specify (e.g., associate, define) timing information (e.g., a start time, an end time, a periodicity, time windows) for corresponding device types. An example device type can comprise an appliance, a smart device, a smart phone, a tablet, a fitness device, a health tracking device, a television, a set top box, a gateway, a streaming media device, a fridge, a washing machine, a dryer, a stove, a smart cooking device (e.g., a crockpot, a grill, a thermometer, a heating element), a transportation device, security system device, home automation device, lighting device, and/or the like. The scheduling protocol can specify first timing information for a first device type. The scheduling protocol can specify second timing information for a second device type. The scheduling protocol can specify third timing information for a third device type. Additional timing information can be determined for additional device types. As an illustration, during a first time window (e.g., or at a first time), an access point or other device (e.g., the first device 102) can transmit and/or receive data from appliance type devices (e.g., a fridge, a washing machine, etc.). The appliance type devices can transmit and/or receive data (e.g., only) during the first time window. During a second time window (e.g., or at a first time), an access point or other device can transmit and/or receive data from lighting type devices. The lighting type devices can transmit and/or receive data (e.g., only) during the second time window. During a third time window (e.g., or at a third time), an access point or other device can transmit and/or receive data from security type devices. The security type devices can transmit and/or receive data (e.g., only) during the third time window. Devices in the system 100 can be configured to only transmit during times specified and/or derived from timing information associated with the devices' device type.

The timing information determined using the scheduling protocol can be timing information for providing (e.g., sending, transmitting) a transmission using a communication protocol, such as a wireless protocol. The scheduling protocol can specify different timing information for use with different communication protocols (e.g., wireless protocols), device types, devices, and/or the like. The scheduling protocol can coordinate transmission times and/or transmission gaps (e.g., time when no transmission is provided) between transmissions of two or more communication protocols (e.g., wireless protocols). For example, the scheduling protocol can coordinate transmission times between transmissions sent using the two or more communication protocols (e.g., or sent from two or more device types) such that interference (e.g., collisions) between transmissions of at least two different communication protocols are avoided. In an aspect, the scheduling protocol can be incorporated into one or more communication protocols, such as wireless communication protocols. The scheduling protocol can specify timing information for the one or more communication protocols (e.g., within a device or from one device to another), and/or device types. The scheduling protocol can provide tuning information to one or more devices. The one or more devices can use the timing information to override or replace timing information of a communication protocol. The device can delay transmissions utilizing one or more communication protocols based on the timing information provided by the scheduling protocol. For example, the one or more devices can send and/or receive transmissions only during times and/or time windows specified by the timing information.

For example, the scheduling protocol can specify first timing information (e.g., a first start time, a first end time, a first periodicity, first time windows) for the first protocol (e.g., a first wireless protocol, such as WiFi). The scheduling protocol can specify second tuning information (e.g., a second start time, a second end time, a second periodicity, second time windows) the second protocol (e.g., a second wireless protocol, such as ZigBee®). The scheduling protocol can specify third timing information (e.g., a third start time, a third end time, a third periodicity, third time windows) for a third protocol (e.g., a third wireless protocol, such as Bluetooth®).

In an aspect, the timing unit 116 can be configured to synchronize the first device 102 with another device, such as the second device 124. For example, the first device 102 can detect a transmission of another device. The first device 102 can determine fourth timing information based on the transmission. The fourth timing information can comprise a time associated with sending and/or receiving the transmission. The fourth timing information can comprise a start time associated with the beginning of the transmission, an end time associated with the end of the transmission, a duration of the transmission, a periodicity of the transmission, and/or the like. For example, the fourth timing information can be compared to fifth timing information (e.g., start times, periodicity) specified (e.g., or associated, defined) and/or the like by the scheduling protocol. As a further example, the fifth timing information can comprise timing information specified by the scheduling protocol, such as the first timing information, the second timing information, and/or the third timing information described above. The fifth timing information can be determined (e.g., selected) from among the first timing information, the second timing information, and/or the third timing information based on a type of transmission, a wireless protocol used for the transmission, a device providing the transmission, and/or the like. In an aspect, sixth timing information (e.g., for a current or future transmission by the first device 102) can be determined by determining a difference, a time offset, and/or the like between the fourth timing information and the fifth timing information specified by the scheduling protocol. For example, the sixth timing information can be determined based on adding, subtracting, and/or the like the difference, the time offset, and/or the like from the fifth timing information specified by the scheduling protocol.

In an aspect, the scheduling protocol can specify the timing information (e.g., the first timing information, the second timing information, the third timing information) based on a device type. Example device types can comprise access points, client devices, wireless nodes, sensors, and/or the like. For example, the scheduling protocol can specify the first timing information for a first device type (e.g., access point). The scheduling protocol can also specify the second timing information for a second device type (e.g., client device). The scheduling protocol can further specify the third timing information for a third device type (e.g., a wireless node, a sensor node, an automation device).

In an aspect, the scheduling protocol can prioritize transmissions. For example, the scheduling protocol can specify one or more priorities for corresponding devices, wireless protocols, and/or the like. The scheduling protocol can specify a first priority for a first category (e.g., a first device type, a first wireless protocol), a second priority for a second category (e.g., a second device type, a second wireless protocol), a third priority for a third category (e.g., a third device type, a third wireless protocol), and/or the like. For example, certain types of sensors can be associated with a higher priority than other types of sensors or devices. As an illustration, security sensors (e.g., a door sensor, a window sensor, a smoke sensor) can be prioritized over remote controlled devices (e.g., remote controlled sensors, automation devices). In an aspect, the scheduling protocol can override tinting information (e.g., a schedule associated with a type of device) based on the prioritization. As an example, a type of transmission that is typically constrained to a particular time slot associated with a particular wireless protocol can be prioritized to take transmission time slots associated with other wireless protocols. In another aspect, the prioritization can be subject to, or otherwise constrained to, the timing information. For example, a device may be constrained to send transmissions within a particular time slot associated with a particular wireless protocol, but access to such time slot may be given on a prioritized basis to certain types of devices and/or certain types of transmissions.

In an aspect, the scheduling protocol can comprise a type of time division multiple access (TDMA) applied to heterogeneous networks (e.g., the first network 106, the second network 110, the third network 114). For example, one or more users can deploy devices that use a variety of different wireless protocols (e.g., the first protocol, the second protocol, the third protocol). These wireless protocols can configure the devices to use overlapping portions of a shared radio frequency spectrum. If the devices are within range of each other, interference can result. Accordingly, the scheduling protocol can specify the timing information for one or more of the wireless protocols to coordinate transmission on the heterogeneous networks. For example, the scheduling protocol can comprise, store, maintain and/or the like timing information for each of the wireless protocols (e.g., the first timing information, the second timing information, the third timing information). The timing information can be stored in a data structure, such as a database, a list, a data sheet, and/or the like. The timing information can be specified in programming modules of computer code. The timing information can be static or updateable.

In an aspect, the scheduling protocol can be configured to specify the timing information based on a type of a protocol, such as protocols categorized as low power, high power, low latency, high latency, and/or the like. Wireless protocols (e.g., ZigBee®, Bluetooth®, Z-Wave®, the second protocol, the third protocol) optimized for a premises information network (e.g., security and automation of a premises, such as a home or building) typically have low power, short duty cycle, low latency, and low data rate characteristics in comparison to wireless protocols for wireless local area networking (e.g., the first protocol, WiFi), which typically have higher data rates, higher power usage, and more variable demand characteristics. The scheduling protocol can be an optimal scheduling protocol for the co-existence of multiple types of wireless networks (e.g., the first network 106, the second network 110, the third network 114). For example, the scheduling protocol can schedule a period of time at a known repetition rate for transmission using the first network (e.g., the home security and automation network). The scheduling protocol can schedule devices to use the wireless network at periods of time communicated and/or otherwise determined by devices using the wireless networks. As an illustration, using the scheduling protocol, a device (e.g., second device 124) can burst, using the first protocol, an interference free, low latency small amount of data in comparison to wireless networks not configured with the scheduling protocol. The scheduling protocol can be configured to schedule devices to use other communication protocols (e.g., the second protocol, the third protocol) during some or all of remaining time not scheduled for the use by the first protocol for high speed data transmission.

In an aspect, the scheduling protocol can be configured to coordinate scheduling between different wireless protocols (e.g., or networks) based on each wireless protocol's (e.g., or network's) intended purpose, use, latency goals, packet size, and/or the like. As an illustration, the scheduling protocol can specify timing information for transmissions (e.g., ZigBee®, Z-Wave®, Bluetooth®) that comprise information for controlling structural automation (e.g., home or business automation), such as remote control packets. The first transmissions can specify timing information for transmissions from a sensor, such as a door sensor, a window sensor, a motion detector, a temperature sensor, a humidity sensor, and/or the like. In an aspect, the scheduling protocol can be configured to determine timing information for transmissions based on an average packet size, a range of packet sizes, and/or the like, associated with a corresponding protocol, a device, a type of device, and/or the like.

In an aspect, the scheduling protocol can be configured to specify the timing information based on network information. Network information can comprise network address information (e.g., Internet Protocol address, Media Access Control address), device identity information, presence of other devices, communication protocols (e.g., wireless protocol) used by the other devices, location of the other devices, and/or the like. For example, the scheduling protocol can instruct the first device 102 to detect the network information. The scheduling protocol can use the detected network information to determine a customized time schedule for the first device 102. In some scenarios, the customized time schedule can be transmitted to the other devices to allow all the devices to access various wireless networks according to the customized schedule determined by the scheduling protocol.

In an aspect, the timing unit 116 can be configured to use the scheduling protocol to determine the timing information during a default operational mode, during an enhanced operational mode, in response to a triggering condition, and/or the like. Default operational mode can comprise a standard and/or initial operational mode set by a user, manufacturer, service provider, and/or other prior functionality mode of the network device. Enhanced operational mode can comprise an operational mode that prioritizes performance (e.g., minimizing latency, maximizing data transfer speeds, maximizing interoperability and access to services) over power savings. For example, the triggering condition can comprise an occurrence of a pre-defined time, a receipt of data, an occurrence of an event, and/or the like. As an illustration, the triggering condition can comprise the detection of interference (e.g., as the first device 102). The first device 102 can provide (e.g., send) a first transmission (e.g., beacon, data signal) via the first protocol. The first device 102 can detect a second transmission (e.g., probe request, data signal) that interferes with (e.g., uses the same or similar frequencies at the same time) the first transmission. The second transmission can use the first protocol and/or the second protocol. In response to detecting interference, the first device 102 can begin using the scheduling protocol to determine timing information for future transmissions.

In one aspect, the triggering condition can comprise receipt of an instruction to begin using the scheduling protocol. For example, the instruction can be received from a user, a service provider (e.g., content provider), another device (e.g., the device that sent the second transmission). Similarly, the first device 102 can be configured to instruct other devices to start and/or stop using the scheduling protocol. The first device 102 can send the instruction to other devices via the first network 106, the second network 110, and/or the third network 114.

In an aspect, the triggering condition can comprise a current time (e.g., of the first device 102) matching (e.g., being within, past, the same as) a time window. The time window can be defined by a start time and/or end time. The timing unit 116 can determine the time window based on an activity history. The activity history can comprise a history of communication, processing, power level, functionality level, and/or the like associated with a device, such as the first device 102. The activity history can be collected and/or stored locally, such as on the first device 102, on a remote server, and/or on another device, such as the second device 124. Activity history can be provided from one device to another. For example, the first device 102 can receive at least a portion of the activity history (e.g., collected and stored by the second device 124) from the second device 124. For example, the activity history can comprise a time (e.g., a time stamp) for each activity. The timing unit 116 can determine the time window based on one or more time periods during which a threshold level (e.g., no activity, any activity, a number of events, frequency of events) of activity occurs or does not occur.

As an illustration, if activity occurs from a first time (e.g., 5 pm) to a second time (e.g., 11 pm) for a threshold time period, such as number of days (e.g., 1, 2, 5, 10, 30), then the timing unit 116 can determine a time window for using the scheduling protocol. When the first device 102, detects that the current time matches (e.g., is within) the determined time window, the timing unit 116 can be configured to determine timing information based on the scheduling protocol.

In an aspect, the first device 102 can comprise a control unit 118 configured to control functionality of the first device 102. For example, the control unit 118 can be configured to initiate one or more transmissions (e.g., beacons, data signals) based on the timing information determined by the timing unit 116. For example, the control unit 118 can transmit the one or more transmissions via the first network unit 104, the second network unit 108, the third network unit 112, and/or the like. The control unit 118 can be configured to provide the one or more transmissions during one or more time windows specified by the scheduling protocol. As a further example, the control unit 118 can be configured to provide the one or more transmissions at start times and according to periodicities specified by the scheduling protocol.

In an aspect, the control unit 118 can be configured to modify functionality of the first device 102 based on the scheduling protocol. For example, the control unit 118 can determine inactivity time windows based on the scheduling protocol. An inactivity time window can comprise a time window during which a device, such as the first device 102 or second device 124, is scheduled (e.g., by the scheduling protocol) to not send transmissions using one or more corresponding protocols. For example, the first device 102 and/or the second device 124 can be configured to disable and/or prevent transmissions associated with one or more wireless protocols, one or more device types, and/or the like during an inactivity period.

In an aspect, modifying functionality can comprise reducing functionality. For example, the control unit 118 can be configured to reduce functionality of the first device 102. Reducing functionality can comprise reducing (e.g., decrease frequency of) transmissions, stopping transmissions, and/or otherwise preventing transmissions from the first device 102 (e.g., while a power source is disconnected or connected). For example, reducing functionality can comprise enabling or disabling a software setting, enabling or disabling hardware of the first device 102, and/or the like. Default functionality can comprise a standard operational mode set by a user, a manufacturer, a service provider, and/or the like. For example, the default functionality can rely on transmission times specified by known communication protocols. Enhanced functionality can comprise an operational mode that prioritizes performance (e.g., minimizing latency, maximizing data transfer speeds, maximizing interoperability and access to services over power savings. An example software setting can comprise a power usage level, a power source, a power mode, one or more settings (e.g., thresholds) specifying amounts of functionality (e.g., power usage) to use when certain conditions occur, and/or the like.

Reducing functionality of the first device 102 can comprise reducing power to at least a portion (e.g., the first network unit 104, the second network unit 108, the third network unit 112, or portions thereof) of the first device 102. Reducing functionality of the first device 102 can comprise disconnecting at least a portion (e.g., the first network unit 104, the second network unit 108, the third network unit 112, or portions thereof) of the first device 102 from a power source. For example, all or a portion of a circuit (e.g., a field programmable gate array, an application specific integrated circuit) of the first device 102 can be disconnected from the power source. Reducing functionality of the first device 102 can comprise reducing power to, disconnecting power from (e.g., powering down), and/or the like, all or a portion of the first receiver 103, the second receiver 107, and/or the third receiver 111. Reducing functionality of the first device 102 can comprise reducing power to, disconnecting power from (e.g., powering down), and/or the like all or a portion of the first transmitter 105, the second transmitter 109, and/or the third transmitter 113. Reducing functionality of the first device 102 can comprise reducing power to, and/or disconnecting power from the first radio front end 115, the second radio front end 117, the third radio front end 119, and/or the like.

In an aspect, modifying functionality can comprise restoring, increasing, enhancing, and/or otherwise improving functionality of the first device 102. For example, the control unit 118 can be configured to restore (e.g., enhance) functionality of the first device 102. The control unit 118 can be configured to restore functionality after the inactivity window ends. As another example, the control unit 118 can be configured to restore functionality during one or more time windows for transmitting information specified by the scheduling protocol. For example, the control unit 118 can be configured to restore functionality at or before one or more start times and/or according to one or more periodicities specified by the scheduling protocol.

Restoring functionality can comprise increasing (e.g., increase frequency of) transmissions, starting transmissions, and/or otherwise allowing transmissions from the first device 102. For example, restoring functionality can comprise enabling or disabling a software setting, enabling or disabling hardware of the first device 102, and/or the like. Restoring functionality of the first device 102 can comprise increasing power to at least a portion (e.g., the first network unit 104, the second network unit 108, the third network unit 112, or portions thereof) of the first device 102. Restoring functionality of the first device 102 can comprise connecting at least a portion (e.g., the first network unit 104, the second network unit 108, the third network unit 112, or portions thereof) of the first device 102 to a power source. For example, all or a portion of a circuit (e.g., a field programmable gate array, an application specific integrated circuit) of the first device 102 can be connected to a power source. Restoring functionality of the first device 102 can comprise restoring power to, connecting power to (e.g., powering down), and/or the like all or a portion of the first receiver 103, the second receiver 107, and/or the third receiver 111. Restoring functionality of the first device 102 can comprise increasing power to, connecting power to powering up), and/or the like all or a portion of the first transmitter 105, the second transmitter 109, and/or the third transmitter 113. Restoring functionality of the first device 102 can comprise increasing power to, and/or connecting power from the first radio front end 115, the second radio front end 117, the third radio front end 119, and/or the like 119.

In an aspect, the system 100 can comprise a mesh network 120. The mesh network 120 can comprise a plurality of nodes 122, such as sensor nodes (e.g., door sensor, temperature sensors, window sensors, motion sensors, humidity sensors, cameras). The mesh network 120 can comprise a ZigBee® network, Bluetooth® network, Z-Wave® network, and/or the like. For example, the third network 114 can comprise the mesh network 120. In an aspect, the first device 102 can be communicatively coupled with one or more nodes 122 of the mesh network 120. For example, the first device 102 can be a node in the mesh network 120.

One or more (or each) of the plurality of nodes 122 can be configured to communicate directly with other nodes 122 within range. As an example, a node 122 of the mesh network 120 can receive a transmission from a device (e.g., second device 124). One or more of the plurality of nodes 122 can relay (e.g., send from one node to another) the transmission to nearby nodes 122 (e.g., until the transmission reaches the first device 102). For example, the node 122 of the plurality of nodes 122 can relay the transmission directly to the first device 102 and/or relay the transmission to one or more intermediate nodes 122 within the mesh network 120, which can further relay the transmission to the first device 102. As a further example, though not shown, it is contemplated that the nodes 122 can be configured to communicate via one or more of the first network 106, the second network 110, and the third network 114. For example, the mesh network 120 is shown separately only for purposes of illustration.

In some scenarios, shared spectrum in unlicensed frequency bands can rely on CSMA-CA protocol or other similar protocol. Using CSMA-CA protocol, a device (e.g., the first device 102, the second device 124) may first monitor for transmissions using the shared spectrum, and only transmit when other users of the shared spectrum stop transmitting. A variable back off (e.g., each device will wait for a random time before attempting to transmit) can be used so that multiple devices do not begin transmitting at the same time once the shared spectrum is no longer being used. Using the CSMA-CA protocol a "hidden node" problem can occur when there is attenuation between the transmitting device (e.g., the first device 102, the second device 124) and the receiving device (e.g., the first device 102, the second device 124). For example, the transmitting device may detect interference that is not impacting the receiving device. Likewise, the transmitting device may not detect interference that is impacting the receiver. In such situation, CSMA-CA protocol can be counter-productive. The scheduling protocol, however, can solve the hidden node problem. For example, a second radio network utilizing a mesh architecture, such as the mesh network 120, can provide an auxiliary communications path between the transmitting device and the receiving device despite attenuation in the radio channel between the transmitting device and the receiving device. The scheduling protocol can be implemented alongside CSMA-CA protocol. The scheduling protocol configures devices to use alternate ways of determining whether the radio channel is available for transmission. As an illustration, the receiving device can listen for and determine a level of interference. The scheduling protocol can configure the receiving device to send, via the mesh network, a message indicating the interference level to the transmitting device. After the transmitter receives a message that the channel is available for transmission (e.g., low or non-existence level of interference), then the transmitting device can initiate a random back-off and then transmit.

As an illustration, the control unit 118 can be configured to prevent (e.g., withhold, disable) transmission and/or otherwise reduce functionality of the first network unit 104 while allowing the second network unit 108 and/or the third network unit 112 to remain functioning. The first device 102 can receive a transmission via the second network unit 108 and/or the third network unit 112. For example, the first device 102 can send and/or receive transmissions relayed via one or more nodes 122 of the mesh network 120. The transmission can be intended for or originate from a device, such as the second device 124. The transmission can comprise a message, request (e.g., beacon, probe request, data signal), notification, and/or the like. After the first device 102 receives the transmission, the control unit 118 can be configured to modify functionality to the first network unit 104, begin using the scheduling protocol, and/or the like.

As previously mentioned, the system 200 can comprise a second device 124. A plurality of devices such as computing device 124 can be deployed, individually or in groups. In one aspect, the second device 124 can comprise an interface unit 126 configured to provide an interface to a user to interact with the second device 124 and/or remote devices, such as the first device 102. The interface unit 126 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player application (e.g., web application), and/or the like. Other software, hardware, and/or interfaces can be used to provide communication between the user and one or more of the second device 124 and the first device 102.

In an aspect, the second device 124 can comprise a communication unit 128. As an example, the communication unit 128 can request or query various files from a local source and/or a remote source. As a further example, the communication unit 128 can transmit and/or receive data to a local or remote device such as the first device 102. The communication unit 128 can comprise hardware and/or software to facilitate communication. For example, the communication unit 128 can comprise one or more of a modem, a digital-to-analog converter, an analog-to-digital converter, an encoder, a decoder, a modulator, a demodulator, a tuner (e.g., QAM tuner, QPSK tuner), and/or the like. The communication unit 128 can comprise one or more transceivers e.g., a transmitter, a receiver). For example, the communication unit 128 can comprise a WiFi transceiver, a cellular transceiver (e.g., 3G, 4G LTE, LTE Advanced), a Bluetooth® transceiver, a ZigBee® transceiver, a Z-Wave® transceiver, an infrared transceiver, and/or the like. As a further explanation, the communication unit 128 can comprise the same or similar features described herein for the first network unit 104, second network unit 108, and third network unit 112 of the first device 102.

Though not shown, it is contemplated that the second device 124 can also be configured with the same or similar features as described for the timing unit 116 and the control unit 118 of the first device 102. For example, the second device 124 can be configured to determine timing information in a similar manner as the first device 102. The second device 124 can be configured to provide (e.g., send, transmit) transmissions based on the scheduling protocol in a similar manner as the first device 102. For example, the second device 124 can determine timing information, such as time windows, start times, periodicity, and/or the like for sending transmissions. The timing information can be specific to a corresponding device, wireless protocol, and/or the like as specified by the scheduling protocol. The second device 124 can be configured to modify (e.g., reduce and restore) functionality of the second device 124 in a similar manner as the first device 102. As an illustration, the second device 124 can receive a message comprising timing information, such as a time window, from other devices, such as the first device 102. Similarly the second device 124 can receive an instruction from another device, such as the first device 102, to use the scheduling protocol. The instruction can be delivered to the second device 124 via the mesh network 120. The second device 124 can determine timing information according the scheduling protocol in response to receiving the instruction. The second device 124 can determine inactivity time windows and reduce functionality during the inactivity time windows (e.g., while the first device 102 is scheduled to not transmit information). Furthermore, the second device 124 can send messages indicating timing information associated with reduced functionality of the second device 124.

The following are several illustrations regarding implementation of the system 100. It should be noted that, though specific devices are mentioned for purposes of illustration, it is contemplated that the disclosed examples can be performed by any computing device, such as a network device. An example system can comprise one or more devices, such as a wireless access point, a computing station, a television, a streaming device, a mobile device, and/or a plurality of sensors. The plurality of sensors can comprise a door sensor, a motion sensor, a temperature sensor, a humidity sensor, an utility usage sensor (e.g., water usage, electricity usage). The devices in the system can be configured to communicate using a variety of communication protocols. For example, the wireless access point can have a WiFi radio, a Bluetooth® radio, and/or a ZigBee® radio. The plurality of sensors can comprise corresponding ZigBee® radios. A portion of the plurality of sensors can also comprise corresponding Bluetooth® radios. The mobile device can comprise a Bluetooth® radio and a WiFi radio. At least a portion of the devices can be configured to use the scheduling protocol to determine when to send transmissions and/or when to withhold transmissions. It should be understood that these example can be used with any other communication protocol (e.g., using a shared communication medium) and are not limited to WiFi, Bluetooth®, and ZigBee®.

As an example, the mobile device can receive a request (e.g., from a user) to send a WiFi transmission. The mobile device can access the scheduling protocol to determine an appropriate time to use the WiFi radio to send the WiFi transmission. For example, the mobile device can access a rule of the scheduling protocol that specifies when WiFi transmission can be sent. The rule can specify a start time for sending WiFi transmissions. The rule can also specify periodicity or frequency for sending additional transmissions after the start time. For example, the start time can be relative to a repeating time cycle. The start time can be relative to a relative to an absolute time. As an another example, the scheduling protocol can comprise schedule specific to WiFi transmissions. The schedule can be generated dynamically based on other devices detected within communication range, network conditions, and/or the like. For example, the schedule can comprise start times (e.g., time window) for one or more of the devices having WiFi radios (e.g., within communication range, historically detected).

As another example, a temperature sensor (e.g., or other sensor) can be configured to send periodic transmissions of sensor data to the wireless access point (e.g., or other user device via the wireless access point). Before sending a ZigBee® transmission (e.g., with the sensor data), the temperature sensor can determine using the scheduling protocol a time window (e.g., a period of time having one or more of a start time and an end time) for sending ZigBee® transmissions using the ZigBee® radio. The scheduling protocol can specify the time window as specific to ZigBee® transmissions. The scheduling protocol can specify priority information. For example, the temperature sensor can be associated with a first priority and a door sensor can have a second priority. The temperature sensor can listen for other ZigBee® transmissions having a higher priority than the first priority, such as transmission from the door sensor. If none are detected, and the current time of the temperature sensor is within the time window, the temperature sensor can send the ZigBee® transmission. As another example, the scheduling protocol can specify a wait time (e.g., or delayed time window) before sending a transmission. The wait time can be based on historical communication data (e.g., prior transmissions detected or received). For example, if the door sensor typically sends ZigBee® transmissions between a first time (e.g., 3 pm) and a second time (e.g., 3:30 pm), then the scheduling protocol can specify a time window after the second time (e.g., because the temperature sensor is a lower priority than the door sensor).

As another example, the mobile device can receive a request to send a transmission (e.g., from a user). The mobile device can access the scheduling protocol to determine whether a current time of the mobile device is within a time window associated with a first communication protocol (e.g., WiFi) or a time window associated with a second communication protocol (e.g., Bluetooth®). If the time window is currently open for transmissions using the second communication protocol, then the mobile device can send the transmission using a radio configured to send transmissions using the second communication protocol.

Figure 2:
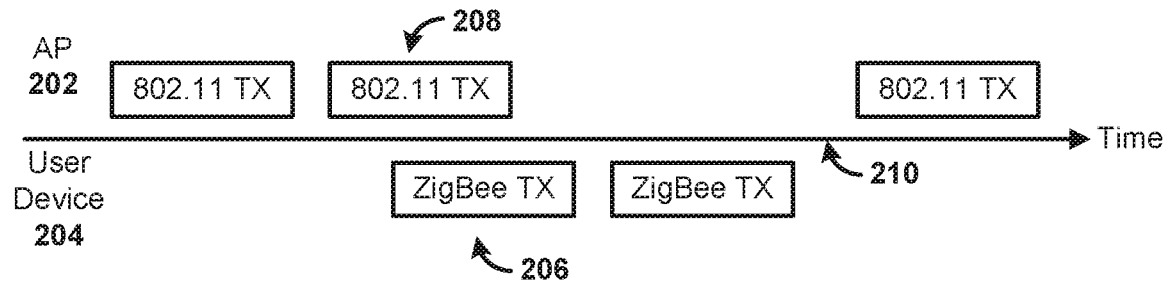
FIG. 2 is a diagram illustrating communication between network devices.

FIG. 2 is a diagram illustrating communication between an access point 202 (e.g., wireless access point) and a user device 204, such as a client. Actions performed by the access point 202 are shown above the timeline 210, and actions performed by the user device 204 are shown below the timeline 210. The access point 202 can attempt to coordinate WiFi transmissions with transmissions using other wireless protocols, such as ZigBee®, Bluetooth® (e.g., Bluetooth® low energy), Z-Wave®, and/or other wireless networks. In one scenario, a device (e.g., the access point 202) can comprise multiple radios (e.g., transmitters, receivers such as a WiFi radio, Bluetooth® radio, ZigBee® radio, and/or the like. In such a scenario, the device can coordinate, using a scheduling protocol, transmissions between the multiple radios by sending timing information (e.g., time for scheduled transmission) via a communication path (e.g., wired communication path) within the device. The scheduling protocol can be the scheduling protocol described herein. For example, the scheduling protocol can coordinate transmission between a variety of devices and protocols using a scheduling rules. The scheduling rules can specify time periods, periodicity, priority, start times, end times, and/or the like for transmissions specific to a device, category of devices, communication protocol, category of communication protocols, device location, and/or the like. In another scenario, the multiple radios can be disposed in separate devices. In such a scenario, the separate devices can be configured to coordinate between radio resources by transmitting timing information via any available communication path (e.g., wireless communication path, WiFi, ZigBee®, Bluetooth®), which communication path may or may not include intermediary devices, such as a coordinating device or controller. As an illustration, some ZigBee® client devices, such as door sensors, may not coordinate transmissions. These client devices may remain in a sleep state until triggered to transmit information (e.g., in response to detecting an event, such as opening or closing of a door). Following transmission, such devices may enter a sleep state (e.g., power saving) until detection of another event.

In an aspect, the access point 202 can be configured to minimize data collisions with the user device (e.g., ZigBee® client device). As explained above, the user device 204 can be configured to transmit data upon the detection of an event. Depending on when the event occurs, the user device 204 may cause a data collision by transmitting data at the same time as the access point 202 is transmitting data. As illustrated in FIG. 2, a first transmission 206 (e.g., first ZigBee® transmission) can be provided from the user device 204 at least partially overlapping in time with a second transmission 208 (e.g., second WiFi transmission) from the access point 202. It should be understood that the WiFi (e.g., 802.11x) transmission and Zigbee® transmissions are used as examples for purposes of illustration in FIG. 2, and that it is contemplated that other protocols can be used for data transmission. When the access point 202 detects that the collision has occurred, the access point 202 can be configured to delay transmission of a packet (e.g., leave a gap between transmissions). The delay can be based on an expected size, length, and/or transmission time of data transmission (e.g., data packet, data symbol) from the user device 204. For example, the access point 202 can be configured to delay transmission until the user device 204 has had sufficient time to transmit (e.g., or retransmit) the first transmission 206 (e.g., a first ZigBee® transmission). As an illustration, transmission of a WiFi packet (e.g., a data symbol) can take about 5 microseconds, while transmission of the smallest ZigBee® packet can take about 400 microseconds. Thus, the access point 202 can be configured to delay transmission for at least 395 microseconds to ensure that the first transmission 206 is able to be transmitted without further data collision. Similar delays can be calculated for transmissions using other communication protocols (e.g., WiFi, Bluetooth®) based on a minimum time to transmit a packet using a corresponding communication protocol.

In an aspect, the access point 202 and/or user device 204 can also be configured to determine a transmission time based on a collision avoidance protocol, such as CSMA-CA. For example, the collision avoidance protocol can specify a time period for delaying transmission in the event of detection of a collision. The time period for delaying the transmission can be, for example, a randomly chosen period of time. After the time period for delaying the transmission occurs, the access point 202 and/or user device 204 can detect whether the communication channel is clear (e.g., detect a transmission or lack thereof). If the communication channel is clear, then the access point 202 and/or user device 204 can provide the transmission. For example, the access point 202 can delay providing another transmission for a time period determined based on a minimum time for allowing the user device 204 to provide a transmission using the collision avoidance protocol.

Figure 3:
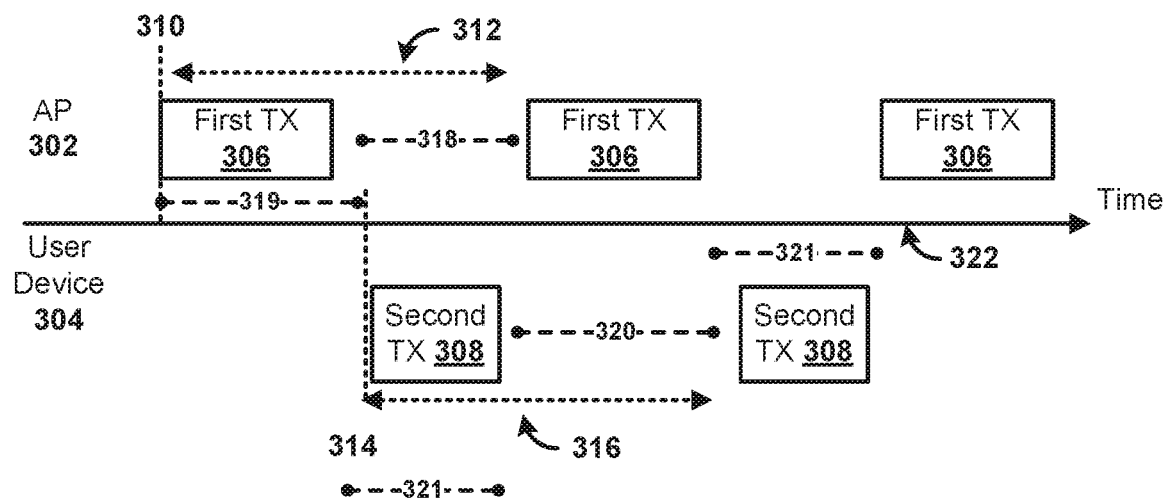
FIG. 3 is a block diagram illustrating communication between network devices.

FIG. 3 is a diagram illustrating communication between an access point 302 and a user device 304 (e.g., client device). Actions performed by the access point 302 are shown above the timeline 322, and actions performed by the user device 304 are shown below the timeline 322. The access point 302 can be configured to provide transmissions based on a scheduling protocol. For example, the scheduling protocol can specify time windows for transmissions associated with corresponding device types, wireless protocols, and/or the like. The user device 304 can also be configured to provide transmissions based on the scheduling protocol. As an illustration, the access point 302 can provide first transmissions 306 based on a first wireless protocol, to a first device type, and/or the like. The user device 304 can provide second transmissions 308 based on a second wireless protocol, to a second device type, and/or the like. The scheduling protocol can specify (e.g., define, associate) a first start time 310, a first periodicity 312, a first time window 319 (e.g., transmission window, transmission gap window), a first end time, and/or the like for the first transmissions 306. The first periodicity 312 can comprise a frequency of occurrence of the first time window, a time between the beginning of successive first time windows, and/or the like. The scheduling protocol can specify (e.g., define, associate) a second start time 314, a second periodicity 316, a second time window 321, a second end time, and/or the like for the second transmissions 308. The second periodicity 316 can comprise a frequency of occurrence of the first time window 319, a time between the beginning of successive first time windows, and/or the like. In some scenarios, the scheduling protocol can define inactivity periods, such as a first inactivity period 318 for the first transmissions 306 and/or a second inactivity period 320 for the second transmissions 308. In another scenario, the inactivity periods can be determined based on the start times, the periodicity, the time windows, and/or the like specified by the scheduling protocol. For example, the first inactivity period 318 can be similar to, equivalent to, the same as, comprise, and/or otherwise be related to the second time window 321. The second inactivity period 320 can be similar to, equivalent to, the same as, comprise, and/or otherwise be related to the first time window 319.

In some scenarios, the access point 302 can be configured, based on the scheduling protocol, to duty cycle the receiver of the access point 302. For example, the access point 302 can be configured to duty cycle the receiver during periods (e.g., inactivity periods) in which the access point 302 is not scheduled to provide transmissions by the scheduling protocol. Duty cycling can comprise listening for data signals, such as probe requests, at limited times. If the user device 304 does not utilize the scheduling protocol, data transmissions (e.g., probe requests) from the user device 304 may have to be sent one or more times before the data transmission is sent during the receiver's "on" window.

Monitoring for data signals (e.g., probe requests) and/or duty cycling can allow an access point 302 to save power by not sending out data transmissions (e.g., beacons) at various times (e.g., at least while no devices are connected). Since beacons are sent at the lowest modulation level, beacons take a considerable amount of airtime for the amount of data that is sent. By not sending beacons while the access point 302 is off, other wireless devices (e.g., ZigBee® devices, other access points) in the area will have more airtime available for transmissions.

Figure 4:
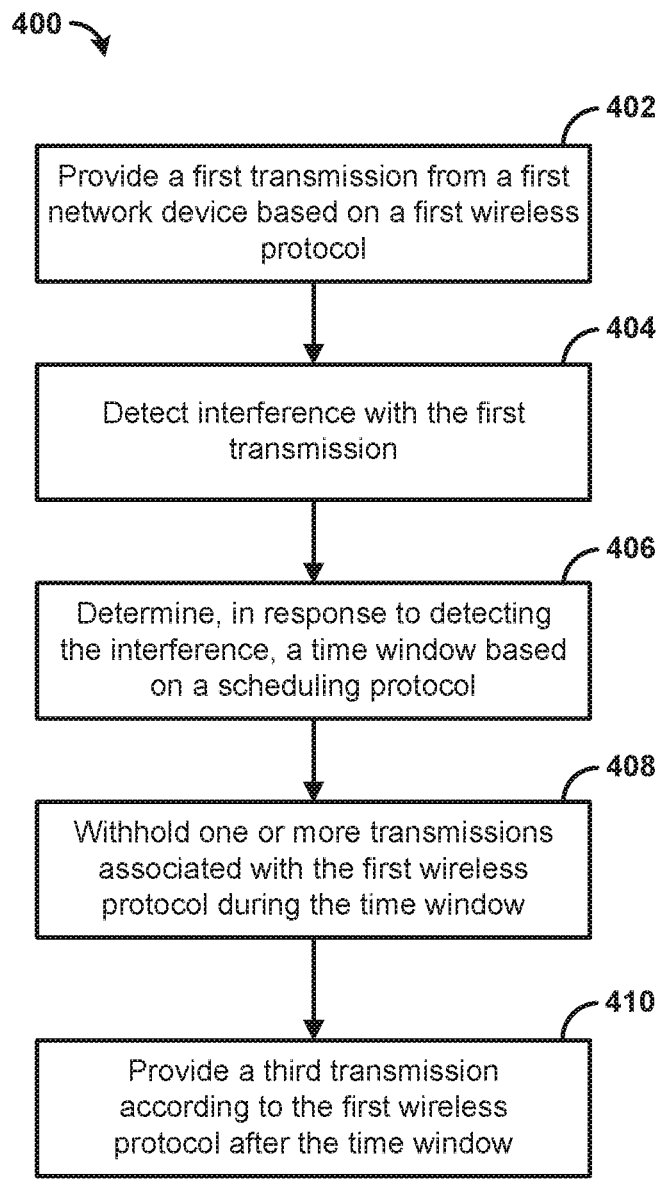
FIG. 4 is a flowchart illustrating an example method.

FIG. 4 is a flowchart illustrating an example method 400 for managing a network device. In an aspect, a scheduling protocol can be used to manage communication between a first network device, a second network device, and/or other devices. The scheduling protocol can be the scheduling protocol described herein. For example, the scheduling protocol can coordinate transmission between a variety of devices and protocols using rules, logic elements, conditions, and/or the like. The scheduling protocol can specify and/or be used to determine time periods, periodicity, priority, start times, end times, and/or the like for transmissions specific to a device, type (e.g., category, grouping) of devices, communication protocol, category of communication protocols, device location, and/or the like.

At step 402, a first transmission based on a first wireless protocol can be provided (e.g., sent, transmitted) from a first network device. The first network device can be of a first device type. For example, the first network device can comprise an access point (e.g., wireless access point), appliance, gateway, set top box, television, mobile device, computing device, smart device, home security device, home automation device, lighting device, and/or the like. The first wireless protocol can comprise a WiFi protocol (e.g., 802.11 based protocol), a ZigBee® protocol, a Bluetooth® protocol (e.g., Bluetooth® low energy), a Z-Wave® protocol, and/or the like. The first transmission can comprise a data transmission, a request, a message, a probe request, and/or the like.

At step 404, interference (e.g., jamming, time domain and/or frequency domain collisions) can be detected. The interference can be interference with the first transmission. Interference can occur two signals compete for communication resources, such as frequencies of a communication medium. Interference can cause the first transmission to fail, become corrupted, and/or otherwise be altered. For example, a interference (e.g., a collision) of the first transmission with (e.g., or from) a second transmission from a second network device (e.g., user or client device) can be detected at the first network device. The second transmission can be based on a second wireless protocol. The second network device can be of a second device type. For example, the second network device can comprise an access point (e.g., wireless access point), appliance, gateway, set top box, television, mobile device, computing device, smart device, home security device, home automation device, lighting device, and/or the like. For example, the second transmission can be received (e.g., at the first network device), while the first transmission is being provided. It can be determined that the second transmission uses the same or similar frequencies (e.g., same frequency band) for providing the second transmission as the frequencies used for providing the first transmission. For example, the collision can occur on a frequency or span of frequencies used for transmission of the first transmission and the second transmission. The first wireless protocol can comprise a WiFi protocol (e.g., 802.11 based protocol), ZigBee® protocol, Bluetooth® protocol (e.g., Bluetooth® low energy), Z-Wave® protocol, and/or the like. In an aspect, the collision can occur when two data transmissions are transmitted at least partially at the same time (e.g., via the same medium and/or signal channel). The collision can be detected based on a variety of techniques, such as detection of the second transmission from the first network device while the first network device is transmitting at least a portion of the first transmission.

At step 406, a time window can be determined based on the scheduling protocol in response to detecting the interference. The time window can be specific to the first wireless protocol. The time window can comprise a start time, an end time, a time duration, a periodicity, and/or the like for using (e.g., or preventing use of) communication protocol (e.g., to send transmissions). The time window can be stored in a data structure, a memory block, and/or the like of a device determining the time window (e.g., the first network device, the second network device). The time window can be transmitted from the first network device to the second network device, from the second network device to the first network device, and/or the like.

The time window can be associated, defined, specified, and/or the like by the scheduling protocol and/or otherwise derived using timing information specified by the scheduling protocol. The scheduling protocol can select the time window based on which communication protocol was used to provide the first transmission (e.g., or will be used for a subsequent transmission). The scheduling protocol can comprise a protocol configured to determine, specify, supply, provide, and/or the like the timing information for devices, transmissions, communication protocols (e.g., wireless communication protocols), functionality (e.g., reduced functionality, default functionality, enhanced functionality), and/or the like. The timing information can comprise time windows, start times, end times, periodicity, time durations, and/or the like. For example, the timing information can comprise timing information specific to one or more of a variety of protocols, such as the first wireless protocol, the second wireless protocol, and/or the like. For example, the time window can be associated with the first wireless protocol and/or the second wireless protocol by the scheduling protocol. In an aspect, the scheduling protocol can associate, define, specify and/or the like time windows (e.g., the time window) based on a device type. Example device types can comprise a security sensor, an automation device, a media server, a gateway, a wireless router, a user device, and/or the like. The scheduling protocol can associate, define, specify, and/or the like transmission time windows specific to corresponding wireless protocols. For example, the scheduling protocol can associate, define, specify, and/or the like the time window as specific to a corresponding wireless protocol. The scheduling protocol can prioritize transmissions based on device type. As an illustration, the scheduling protocol can associate, define, specify, and/or the like a first time window for a first wireless protocol and a second time window for a second wireless protocol. The scheduling protocol can associate, define, specify, and/or the like a first priority for transmissions from devices of a first device type and a second priority for transmissions from devices of a second device type. The first priority can be higher in priority than the second priority.

In an aspect, the scheduling protocol can allocate a period of time and a periodicity in which to stop all transmissions of first wireless protocol. The second wireless protocol can use these time periods for transmission. Thus, the second network device using the second wireless protocol will have opportunities for interference free operation. As an illustration, when the first network device detects interference and/or the collision of the first transmission and the second transmission (e.g., a WiFi packet interferes and/or collides with a ZigBee® packet, a WiFi packet interferes and/or collides with another WiFi packet, a ZigBee® packet interferes and/or collides with another ZigBee® packet, a WiFi packet interferes and/or collides with a Bluetooth® packet, a Bluetooth® packet interferes and/or collides with another Bluetooth® packet, a ZigBee® packet interferes and/or collides with a Bluetooth® packet), the first network device can be configured to stop transmitting until the second transmission is retransmitted. The first network device can determine a priority associated with the second transmission. If the priority is above a threshold priority, and/or the like, the first network device can stop transmitting until the second transmission is received, transmitted (e.g., re-transmitted), and/or the like.

In another aspect, after detecting the interference (e.g., the collision of the first transmission and the second transmission), the first network device can access the scheduling protocol to determine when retransmission of the second transmission is scheduled to occur. The first network device can continue to use the first wireless protocol to send transmissions until the timeframe that the retransmission is determined to occur. The first network device can stop transmitting before the retransmission and allow the retransmission of the second transmission (e.g., a ZigBee® packet) to be provided via the shared spectrum. The first network device can then resume transmitting immediately after the second transmission is finished (e.g., a ZigBee® ack received).

At step 408, one or more transmissions associated with the first wireless protocol can be withheld (e.g., prevented, delayed, stopped), at the first network device, during the time window. For example, the first network device can enter a reduced functionality mode during the time window. Entering a reduced functionality mode can comprise turning off, powering down, disabling usage of, reducing signal strength and/or the like of a component (e.g., a transmitter, a receiver, a transceiver) used by the first network device. For example, the one or more transmissions associated with the first wireless protocol can be scheduled by the first wireless protocol. In an aspect, withholding, at the first network device, the one or more transmissions associated with the first wireless protocol during the time window can comprise powering off a transmitter associated with the first wireless protocol, disabling transmission from the transmitter associated with the first wireless protocol, preventing transmissions from the first transmitter, and/or the like. For example, a setting can be modified that disables and/or otherwise indicates that transmissions (e.g., transmission associated with the first wireless protocol and/or second wireless protocol) are not allowed to be provided from the first transmitter. As a further example, the one or more transmissions can be scheduled for transmission based on the first wireless protocol, the second wireless protocol, another scheduling protocol (e.g., a protocol of channel access, such as carrier sense multiple access protocol, code division multiple access protocol, orthogonal frequency division multiplexing, carrier sense multiple access protocol with collision avoidance (CSMA-CA)).

At step 410, a third transmission can be provided (e.g., transmitted) according to the first wireless protocol after the time window. For example, the third transmission can comprise a beacon signal, data transmission, and/or the like. The third transmission can be provided from the first network device (e.g., or the second network device). The first network device can be configured to determine that the time window has expired (e.g., by comparing a current time to the time window). In an aspect, the first network device can be configured to restore functionality of the first network device (e.g., before providing the third transmission). Restoring functionality can comprise turning on, powering up, enabling usage of, increasing signal strength and/or the like of the component used by the first network device.

Figure 5:
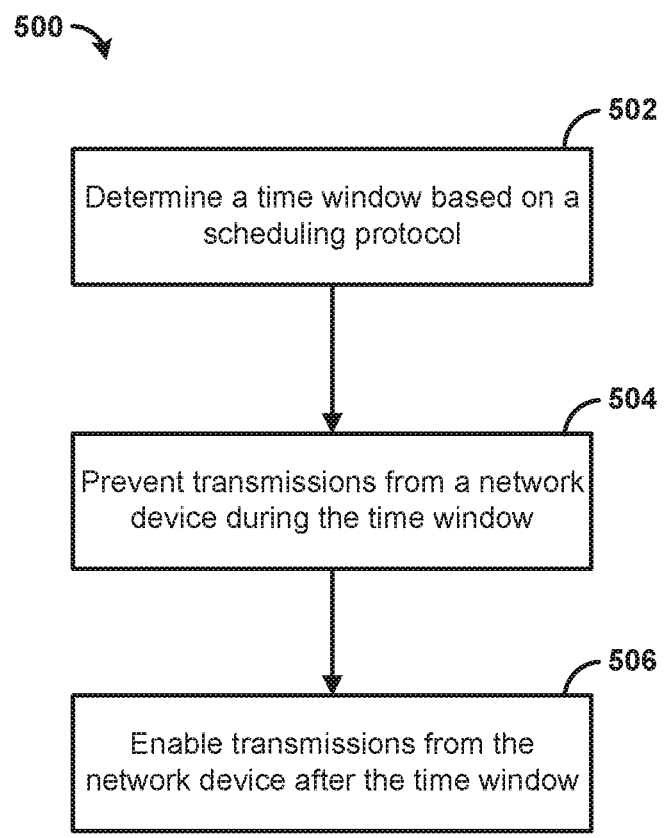
FIG. 5 is a flowchart illustrating another example method.

FIG. 5 is a flowchart illustrating an example method 500 for managing a network device. At step 502, a time window (e.g., associated with a first wireless protocol) can be determined, at a network device, based on a scheduling protocol. For example, the scheduling protocol can be configured to associate the time window with a wireless protocol (e.g., a first wireless protocol). The time window can comprise a start time, an end time, a time duration, a periodicity, and/or the like for using (e.g., or preventing use of) a communication protocol (e.g., to send transmissions). For example, the network device can comprise a wireless access point, a gateway, a set top box, a television, a mobile device, a computing device, a smart device, and/or the like. The scheduling protocol can comprise a protocol configured to determine, specify, supply, provide, and/or the like timing information for devices, transmissions, communication protocols (e.g., wireless communication protocols), functionality (e.g., reduced functionality, default functionality, enhanced functionality), and/or the like. For example, the scheduling protocol can be configured to associate time windows with corresponding wireless protocols. The scheduling protocol can associate, define, specify, and/or the like start times and periodicity for use of the corresponding wireless protocols. The scheduling protocol can associate, define, specify, and/or the like transmission time windows based on a device type. Example device types can comprise a appliance, light device, security device, an automation device, a media server, a gateway, a wireless router, access point, a user device, and/or the like.

The scheduling protocol can prioritize transmission based on device type. As an illustration, the scheduling protocol can associate, define, specify and/or the like a first time window for a first wireless protocol and a second time window for a second wireless protocol. The scheduling protocol can associate, define, specify, and/or the like a first priority for transmissions from devices of a first device type and a second priority for transmissions from devices of a second device type. The first priority can be higher in priority than the second priority.

At step 504, transmissions can be prevented (e.g., withheld, stopped, delayed) from the network device during the time window. The network device can enter a reduced functionality mode during the time window. Entering the reduced functionality mode can cause the transmission to be prevented or can be performed in addition to preventing the transmission. Entering a reduced functionality mode can comprise turning off, powering down, disabling usage of, reducing signal strength and/or the like of a component (e.g., transmitter, receiver, transceiver) used by the network device. As an example, preventing transmissions from the network device can comprise turning off a transmitter of the network device during at least a portion of the time window, preventing transmission associated with the first wireless protocol, disabling transmission (e.g., of beacons) during the time window, and/or the like. For example, a setting can be modified that disables and/or otherwise indicates that transmissions (e.g., transmission associated with the first wireless protocol and/or second wireless protocol) are not allowed to be provided from the first transmitter. As a further example, the transmissions can be scheduled for transmission based on the first wireless protocol, the second wireless protocol, another scheduling protocol (e.g., a protocol of channel access, such as carrier sense multiple access protocol, code division multiple access protocol, and/or orthogonal frequency division multiplexing).

At step 506, transmissions can be enabled from the network device after the time window. For example, the network device can be configured to restore functionality of the network device. Restoring functionality can comprise turning on, powering up, enabling usage of, increasing signal strength and/or the like of the component used by the first network device.

Enabling transmissions can comprise turning on the transmitter of the network device, allowing transmissions associated with the wireless protocol, and/or the like. As another example, the setting can be modified to enable and/or otherwise indicate that transmissions (e.g., transmission associated with the first wireless protocol and/or the second wireless protocol) are allowed to be provided from the first transmitter.

Figure 6:
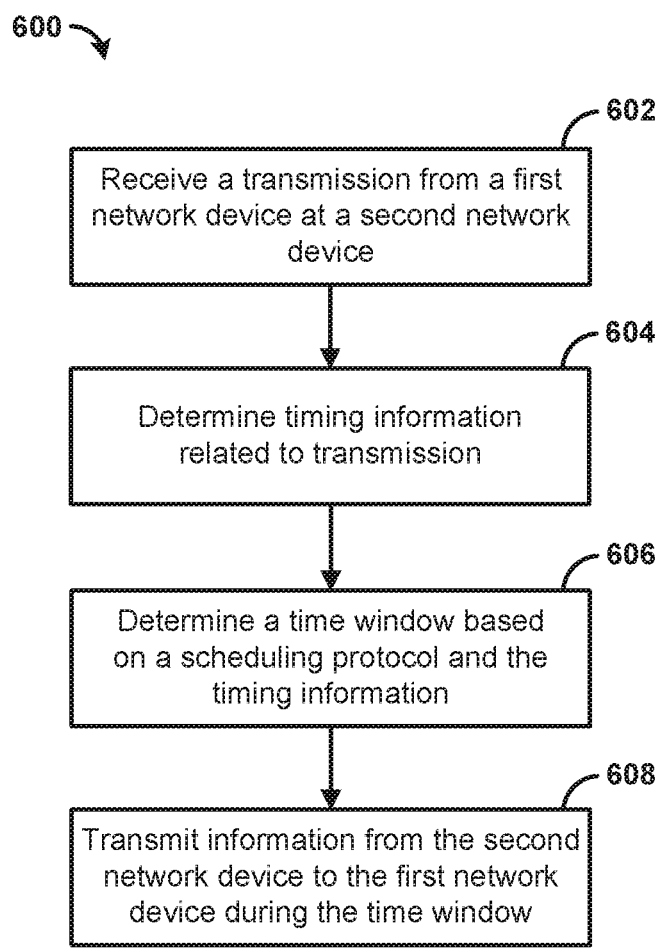
FIG. 6 is a flowchart illustrating yet another example method.

FIG. 6 is a flowchart illustrating an example method 600 for managing a network device. At step 602, a transmission from a first network device (e.g., a wireless access point) can be received at a second network device (e.g., a client device). For example, the first network device can comprise a wireless access point, gateway, a set top box, a television, a mobile device, a computing device, a smart device, a appliance, a lighting device, a security device, and/or the like. The second network device can comprise a wireless access point, a gateway, a set top box, a television, a mobile device, a computing device, a smart device, a appliance, a lighting device, a security device, and/or the like. The transmission can comprise a beacon, such as WiFi beacon, a data signal, a probe request, and/or the like. The transmission can be based on a first wireless protocol, such as WiFi, a cellular protocol (e.g., 3G, 4G LTE, LTE Advanced), ZigBee®, Bluetooth® (e.g., Bluetooth® low energy), Z-Wave®, and/or the like.

At step 604, timing information related to the transmission (e.g., associated with the transmission, associated with the receiving of the transmission, indicative of the time of receiving of the transmission) can be determined. For example, a current time can be determined (e.g., received, requested) from a local clock or a remote clock. The current time can be determined upon receipt of the transmission. In some implementations, the current time can be provided in the transmission (e.g., when estimated based on network conditions). The timing information can comprise a time at which the transmission was received (e.g., or otherwise processed) at the second network device, a time when the transmission was sent (e.g., or otherwise processed) by the first network device, and/or the like. In an aspect, the second network device can synchronize the second network device with the first network device based on the timing information. For example, a first clock of the second network device can be synchronized with a second clock of the first network device based on the scheduling protocol and the timing information.

At step 606, a time window can be determined based on a scheduling protocol and the timing information. The time window can be a time window for providing a transmission from the second network device. The time window can be a time window during which the first network device is predicted to not provide any transmissions. The time window can be specific for a particular shared resources (e.g., frequency range), a communication protocol, and/or the like. The scheduling protocol can be configured to select the time window based on which wireless protocol is used to receive the transmission. The time window can comprise a start time, an end time, a time duration, a periodicity, and/or the like for using (e.g., or preventing use of) a communication protocol (e.g., to send transmissions). The scheduling protocol can comprise a protocol configured to determine, specify, supply, provide, select, and/or the like timing information for devices, transmissions, communication protocols (e.g., wireless communication protocols), functionality (e.g., reduced functionality, default functionality, enhanced functionality), and/or the like. The scheduling protocol can be configured to associate (e.g., specify, define) time windows with (e.g., and/or for) corresponding wireless protocols. For example, the scheduling protocol can associate, define, specify, and/or the like start times and periodicity for use of the corresponding wireless protocols. The scheduling protocol can associate, define, specify and/or the like the time windows based on a device type. The scheduling protocol can prioritize transmission based on device type. Example device types can comprise a security sensor, an automation device, a media server, a gateway, a wireless router, a user device, and/or the like.

In an aspect, the time window can be determined based on the synchronization. For example, the determined timing information can be compared to timing information (e.g., start times, periodicity) specified (e.g., or associated, defined) and/or the like by the scheduling protocol. The timing information specified by the scheduling protocol can be associated with a wireless protocol used to send the transmission from the first network device and/or a device type associated with the first network device. The timing window can be determined by determining a difference, a time offset, and/or the like between the determined timing information and the timing information specified by the scheduling protocol. For example, the timing window can be determined based on adding, subtracting, and/or the like, the difference, time offset, and/or the like from the timing information specified by the scheduling protocol.

The second network device can predict future transmissions (e.g., or times when no transmissions will be provided, which may be specific to a transmission protocol) from the first network device based on the scheduling protocol. Accordingly, the second network device can schedule transmissions to the first network device and/or other network devices at times when the first network device is predicted to not send transmissions. As an illustration, the timing information can comprise a time when the transmission was received by the second network device. The second network device can identify a type of transmission, a wireless protocol used to send the transmission, and/or the like. The second network device can determine a transmission schedule associated with the type of transmission or wireless protocol. For example, the scheduling protocol can comprise the transmission schedule. If the transmission does not match the transmission schedule, then the scheduling protocol can determine a time offset (e.g., to synchronize time or clocks between the first network device and second network device). Using the transmission schedule, the scheduling protocol can provide appropriate times for providing transmissions from second network device (e.g., to avoid collision with future transmissions from the first network device).

It should be noted that the scheduling protocol is not required to use a transmission schedule, but can use any other pre-determined or calculated timing information (e.g., periodicity of transmissions, start time, end time, time window) to determine an appropriate time for providing transmissions. It should also be noted that the timing information determined by the scheduling protocol can be specific to a corresponding communication protocol. For example, the scheduling protocol, transmission schedule, rules, conditions, and/or the like can be configured to provide different timing information for using different communication protocols. The scheduling protocol, transmission schedule, rules, conditions, and/or the like can be configured to provide different timing information depending on which devices and/or communication protocols are being used by other devices (e.g., within range). At step 608, information can be transmitted from the second network device to the first network device during the time window. For example, the first network device can be configured to restore functionality of the network device from a reduced functionality mode. Restoring functionality can comprise turning on, powering up, enabling usage of, increasing signal strength and/or the like of a component (e.g., a receiver, a transmitter, a transceiver used by the first network device that was power down, disabled, configured with a lower signal strength, and/or the like during the reduced functionality mode. For example, transmitting information from the second network device can comprise transmitting a probe request, a data signal, and/or the like. The information transmitted from the second network device can be transmitted according to a second wireless protocol, such WiFi, ZigBee®, Bluetooth® (e.g., Bluetooth® low energy), Z-Wave®, and/or the like. As an illustration, the first wireless protocol can comprise a WiFi based protocol, and the second wireless protocol can comprise a ZigBee®, Bluetooth®, Z-Wave®, and/or the like based protocol.

Figure 7:
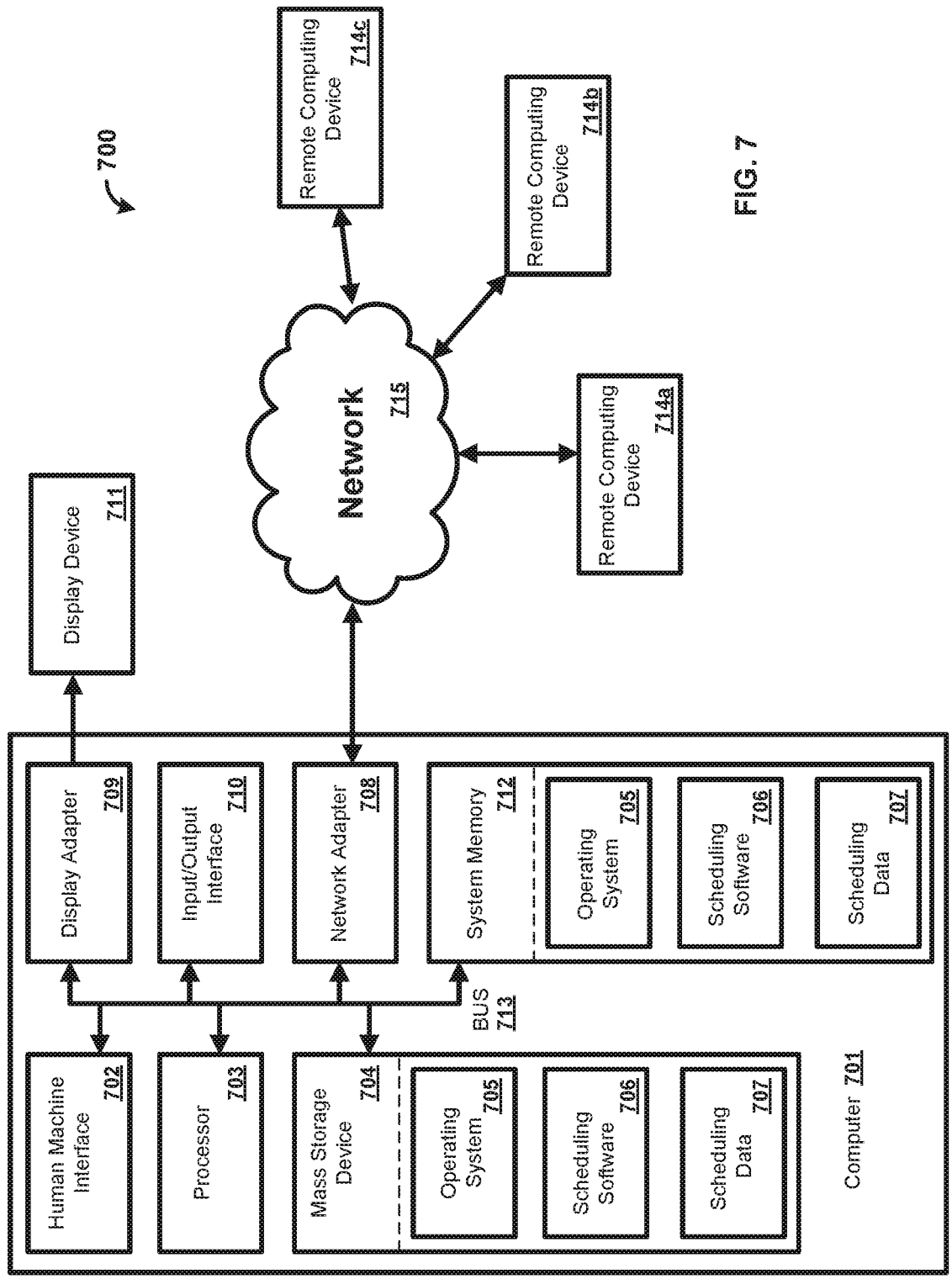
FIG. 7 is a block diagram illustrating an example computing system in which the present methods and systems can operate.

In an exemplary aspect, the methods and systems can be implemented on a computer 701 as illustrated in FIG. 7 and described below. By way of example, the first device 102, the second device 124, and/or the nodes 122 of FIG. 1 can be computers as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed h software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. In an aspect, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 713, and all buses specified in this description can also be implemented over a wired or wireless network connection and each of the subsystems, including the one or more processors 703, a mass storage device 704, an operating system 705, scheduling software 706, scheduling data 707, a network adapter 708, the system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the scheduling data 707 and/or program modules such as the operating system 705 and the scheduling software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the scheduling software 706. Each of the operating system 705 and the scheduling software 706 (or some combination thereof) can comprise elements of the programming and the scheduling software 706. The scheduling data 707 can also be stored on the mass storage device 704. The scheduling data 707 can be stored in any of one or more databases known in the art. Examples of such databases comprise, DB2®, Microsoft® Access, Microsoft® SQL Server, Oracle, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computer 701, and are executed by the data processor(s) of the computer. An implementation of the scheduling software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media" "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by an access point, a first transmission in a first wireless protocol and a second transmission in a second wireless protocol, wherein the access point is configured to communicate via the first wireless protocol and the second wireless protocol;
determining, by the access point, a collision of the first transmission with the second transmission;
determining, based on the collision and based on a minimum time to send a packet using the first wireless protocol, a length of time;
disabling, by the access point, communication using the second wireless protocol for the length of time;
receiving, during the length of time, a third transmission via the first wireless protocol; and
sending, by the access point, after the length of time, a transmissions using the second wireless protocol.

2. The method of claim 1, wherein the first transmission is received from a first device, wherein the first device comprises one or more of a sensor device, a low-power device, or a slave device, and wherein the second transmission is received from a second device, wherein the second device comprises one or more of a smart device, a network device, or a master device.

3. The method of claim 1, wherein the first wireless protocol is based on a low-power communication technique, and the second wireless protocol is based on a high-power communication technique.

4. The method of claim 1, wherein the first wireless protocol comprises one of ZigBee, Bluetooth, or Z-Wave.

5. The method of claim 1, wherein the first transmission is received from a first device and the second transmission is received from a second device, the method further comprising prioritizing the first wireless protocol based on a first device type associated with the first device or a second device type associated with the second device.

6. The method of claim 1, wherein the second wireless protocol comprises one of Wi-Fi, cellular, or satellite.

7. The method of claim 1, wherein disabling communication using the second wireless protocol comprises turning off, at the access point, a transmitter associated with the second wireless protocol.

8. The method of claim 1, further comprising sending, by the access point, timing information associated with the length of time to first device using the first wireless protocol.

9. The method of claim 1, wherein sending, after the length of time, a transmission using the second wireless protocol comprises turning on, at the access point, a transmitter associated with the first wireless protocol.

10. The method of claim 1, further comprising:
causing, by the access point, a device, associated with the first wireless protocol, to send, during the length of time, one or more transmissions using the first wireless protocol; and
causing the device to not send, after the length of time, one or more other transmissions using the first wireless protocol.

11. A method comprising:
sending, by an access point and to a first device, a first transmission in a first wireless protocol;
receiving, by the access point and from a second device, a second transmission in a second wireless protocol different from the first wireless protocol, wherein the access point is configured to communicate via the first wireless protocol and the second wireless protocol;
determining, by the access point, a collision of the first transmission with the second transmission;
determining, based on the collision, a scheduling protocol, and the second wireless protocol, a length of time to send a packet using the second wireless protocol;
disabling, by the access point, communication using the first wireless protocol during the length of time;
receiving, by the access point and from the second device, a re-send of the second transmission in the second wireless protocol during the length of time; and
re-sending, by the access point and based on receiving the re-send of the second transmission, the first transmission to the first device in the first wireless protocol.

12. The method of claim 11, wherein disabling communication using to the first wireless protocol during the length of time comprises causing a transmitter of the access point to turn off during at least a portion of the length of time.

13. The method of claim 11, wherein disabling communication using the first wireless protocol during the length of time comprises reducing power at the access point during at least a portion of the length of time.

14. The method of claim 11, wherein the scheduling protocol defines the length of time based on the second wireless protocol.

15. The method of claim 11, further comprising sending, by the access point, timing information associated with the length of time to the first device.

16. The method of claim 11, wherein disabling communication using the first wireless protocol during the length of time comprises disabling transmission of beacons by the access point during the length of time.

17. The method of claim 11, wherein receiving the re-send of the second transmission from the second device in the second wireless protocol, comprises causing the second device to turn on a transmitter associated with the second wireless protocol.

18. An apparatus comprising:
one or more processors; and
memory storing processor-executable instructions that, when executed by the one or more processors, cause the apparatus to:
receive a first transmission in a first wireless protocol and a second transmission in a second wireless protocol, wherein the apparatus is configured to communicate via the first wireless protocol and the second wireless protocol;
determine a collision of the first transmission with the second transmission;
determine, based on the collision and based on a minimum time to send a packet using the first wireless protocol, a length of time;
disable communication using the second wireless protocol for the length of time;
receive, during the length of time, a third transmission via the first wireless protocol; and
send, after the length of time, a transmissions using the second wireless protocol.

19. The apparatus of claim 18, wherein the first transmission is received from a first device, wherein the first device comprises one or more of a sensor device, a low-power device, or a slave device, and wherein the second transmission is received from a second device, wherein the second device comprises one or more of a smart device, a network device, or a master device.

20. The apparatus of claim 18, wherein the first wireless protocol is based on a low-power communication technique, and the second wireless protocol is based on a high-power communication technique.

21. The apparatus of claim 18, wherein the first wireless protocol comprises one of ZigBee, Bluetooth, or Z-Wave.

22. The apparatus of claim 18, wherein the first transmission is received from a first device and the second transmission is received from a second device, wherein the processor-executable instructions, when executed by the one or more processors, further cause the apparatus to prioritize the first wireless protocol based on a first device type associated with the first device or a second device type associated with the second device.

23. The apparatus of claim 18, wherein the second wireless protocol comprises one of Wi-Fi, cellular, or satellite.

24. The apparatus of claim 18, wherein the processor-executable instructions that, when executed by the one or more processors, cause the apparatus to disable communication using the second wireless protocol, cause the apparatus to turn off, at the apparatus, a transmitter associated with the second wireless protocol.

25. The apparatus of claim 18, wherein the processor-executable instructions, when executed by the one or more processors, further cause the apparatus to send timing information associated with the length of time of the first device using the first wireless protocol.

26. The apparatus of claim 18, wherein the processor-executable instructions that, when executed by the one or more processors, cause the apparatus to send, after the length of time, a transmission using the second wireless protocol cause the apparatus to turn on, at the apparatus, a transmitter associated with the first wireless protocol.

27. The apparatus of claim 18, wherein the processor-executable instructions, when executed by the one or more processors, further cause the apparatus to:
cause a device, associated with the first wireless protocol, to send, during the length of time, one or more transmissions using the first wireless protocol; and
cause the device to not send, after the length of time, one or more other transmissions using the first wireless protocol.

28. An apparatus comprising:
one or more processors; and
memory storing processor-executable instructions that, when executed by the one or more processors, cause the apparatus to:
send, to a first device, a first transmission in a first wireless protocol;
receive, from a second device, a second transmission in a second wireless protocol different from the first wireless protocol, wherein the apparatus point is configured to communicate via the first wireless protocol and the second wireless protocol;
determine a collision of the first transmission with the second transmission;
determine, based on the collision, a scheduling protocol, and the second wireless protocol, a length of time to send a packet using the second wireless protocol;
disable communication using the first wireless protocol during the length of time;
receive, from the second device, a re-send of the second transmission in the second wireless protocol during the length of time; and
re-send, based on receiving the re-send of the second transmission, the first transmission to the first device in the first wireless protocol.

29. The apparatus of claim 28, wherein the processor-executable instructions that, when executed by the one or more processors, cause the apparatus to disable communication using the first wireless protocol during the length of time, cause the apparatus to cause a transmitter of the apparatus to turn off during at least a portion of the length of time.

30. The apparatus of claim 28, wherein the processor-executable instructions that, when executed by the one or more processors, cause the apparatus to disable communication using the first wireless protocol during the length of time, cause the apparatus to reduce power at the apparatus during at least a portion of the length of time.

31. The apparatus of claim 28, wherein the scheduling protocol defines the length of time based on the second wireless protocol.

32. The apparatus of claim 28, wherein the processor-executable instructions, when executed by the one or more processors, further cause the apparatus to send timing information associated with the length of time to the first device.

33. The apparatus of claim 28, wherein the processor-executable instructions that, when executed by the one or more processors, cause the apparatus to disable communication using the first wireless protocol during the length of time, cause the apparatus to disable transmission of beacons during the length of time.

34. The apparatus of claim 28, wherein the processor-executable instructions that, when executed by the one or more processors, cause the apparatus to receive the re-send of the second transmission from the second device in the second wireless protocol, cause the apparatus to cause the second device to turn on a transmitter associated with the second wireless protocol.

* * * * *